Dec. 5, 1961 C. K. MADER 3,011,969
STRIPPER DESIGN
Filed Oct. 15, 1958
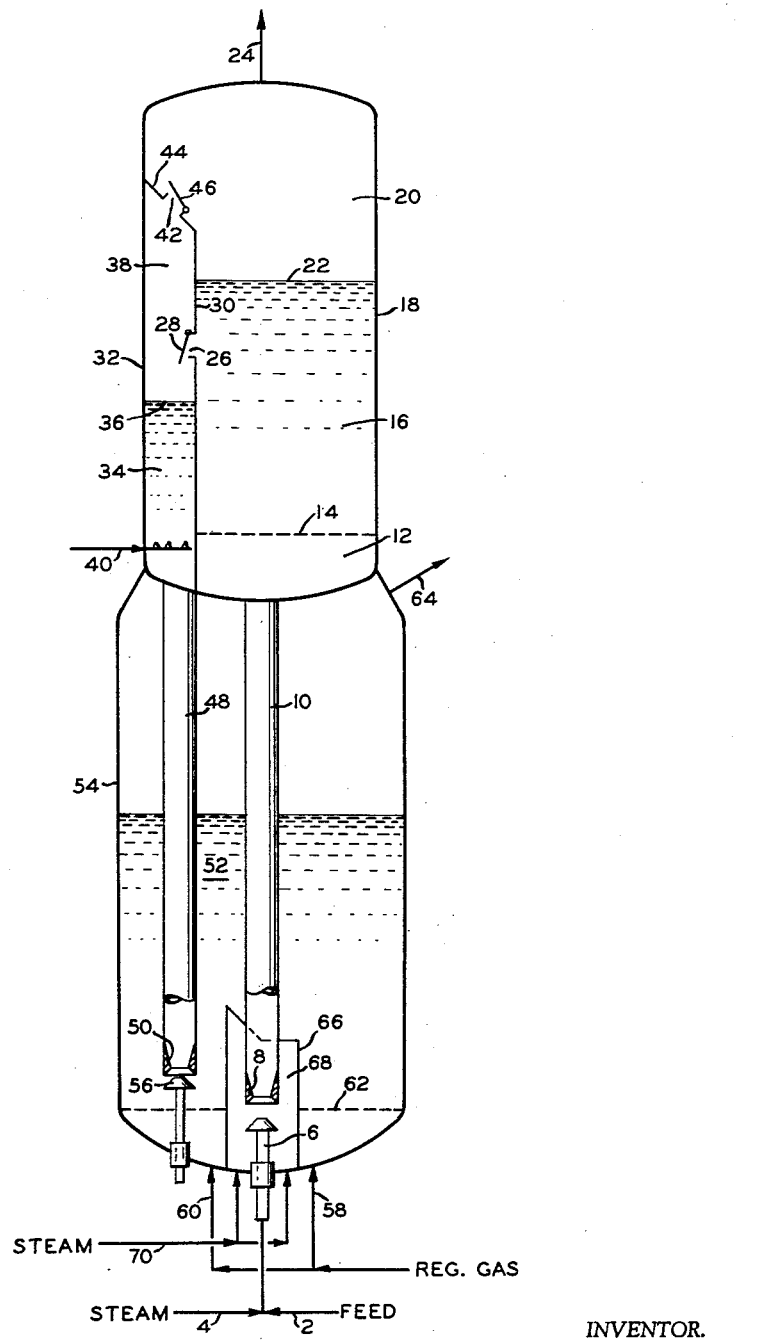
INVENTOR.
CHARLES K. MADER
BY  D. H. Palmer
ATTORNEY
Carl A. Harmsworth
AGENT

United States Patent Office 3,011,969
Patented Dec. 5, 1961

3,011,969
STRIPPER DESIGN
Charles K. Mader, Cold Springs, N.Y., assignor to The M. W. Kellogg Company, Jersey City, N.J., a corporation of Delaware
Filed Oct. 15, 1958, Ser. No. 767,323
10 Claims. (Cl. 208—150)

This invention relates to an improved process and apparatus for the catalytic conversion of hydrocarbons in the presence of fluidized finely divided catalyst material. More specifically, the invention is directed to improvements in the method and apparatus for stripping catalyst particles of occluded and adsorbed volatile hydrocarbons prior to regeneration.

In the dense fluidized catalyst bed cracking systems of the prior art, the fouled or contaminated catalyst is usually withdrawn as a relatively dense fluidized bed or mixture from the catalyst bed in the reaction zone and passed directly to a stripping zone in open communication with the reaction zone wherein volatile hydrocarbons are stripped from the fouled catalyst before regeneration. The efficient stripping of catalyst is a very important aspect of the conversion system in that inefficient stripping results in consumption of products of reaction by burning in the regenerator thereby reducing the valuable product output, as well as lowering the efficiency of the process. Furthermore, the stripping zone must be located between the reaction zone and the regeneration zone, which in many instances presents unique difficulties with respect to transfer of catalyst and the location and design of the stripping zone. Therefore, in the past, the refiner has been plagued with numerous operational difficulties which have been attributed to the stripping zone.

It is the present practice in many fluid catalytic cracking systems to pass the fluidized catalyst from one vessel to another by means of a static pressure head established in a vertical standpipe in open communication with the vessel at the bottom of the dense bed of fluidized catalyst. The standpipe through which the catalyst is withdrawn is of sufficient length to develop the static pressure at its base sufficient to pass the powdered catalyst withdrawn from the first vessel upwardly through a carrier line or riser communicating with the lower end of the standpipe into the second vessel or contact chamber. In the carrier line, the fluid catalyst stream receives an injection of carrier fluid or aerating gas such as air, steam, and other inert gases or hydrocarbon vapors which serve to create a less dense suspension of the catalyst particles within the carrier line. In the case of catalyst being withdrawn from the regenerator for passage to the reactor, the catalyst stream enters the carrier line in contact with a hydrocarbon stream which may or may not be preheated. The latter, if liquid, is usually immediately flash vaporized by contact with the hot regenerated catalyst particles and forms within the carrier line a less dense stream comprising a mixture of catalyst and hydrocarbon vapors.

It has been found by incorporating the reactor and the regenerator of a fluid catalyst system within a single vessel as separate zones or chambers superimposed one above the other that material savings in labor and equipment costs may be effected. In addition, a principal advantage in superimposing the reactor immediately above the regenerator or vice versa is that it permits the use of straight lines of communication between the contact zones for circulating the catalyst or contact material back and forth between the zones. This elimination or reduction in the number of bends within the transfer lines between the zones effects a material reduction in apparatus wear and catalyst attrition within the transfer lines caused by the errosive action of the rapidly moving or high velocity catalyst particles. Since errosion is most serious at the points of sharp curvature in the fluid passage or points where the direction of flow is materially changed and at points where the injection of a fluid carrier or aeration stream into the catalyst carrier line may cause impingement of the catalyst particles against the carrier line wall, it is especially desirable to have the catalyst particles entering or passing through the transfer line and the fluid stream introduced thereto travel in a direction which is in parallel alignment to the axis of the carrier line.

One of the important features or objects of this invention resides in providing a compactly arranged fluidized catalytic conversion system that combines the reaction and regeneration zones within a unitary vessel or shell, thereby extensively reducing the length of necessary transfer piping and entirely enclosing a stripping zone between the reaction and regeneration zones confined within the shell.

A further object of this invention is to provide a confined stripping zone within the unitary vessel which will be more efficient in the stripping of contaminated catalyst withdrawn from the reaction zone.

Other objects and advantages of this invention will become more apparent from the following detailed description and discussion.

In the compact or unitary fluidized conversion system provided by this invention, the reaction chamber is placed above the regeneration chamber within a single substantially vertically positioned vessel. The reaction chamber is separated from the regeneration chamber in the unitary vessel by a common baffle member, most usually a dish-shaped member, through which pass suitable catalyst transfer conduits. A substantially vertical baffle or partition member extends upwardly from the bottom of the reaction chamber or the dish-shaped baffle member to the upper portion of the reaction chamber to form a separate stripping chamber within the reaction chamber. A first open end catalyst transfer conduit or standpipe connects with the bottom of the stripping chamber and extends downwardly into the lower portion of the regeneration chamber wherein a suitable movable flow control plug valve is located and aligned with the bottom open end of the catalyst transfer conduit or standpipe. A second open end catalyst transfer conduit or riser conduit having a hollow stem movable plug valve aligned with the bottom open end thereof extends from the lower portion of the regeneration chamber upwardly into the bottom of the reaction chamber. Suitable cyclone separators are provided in the upper portion of the regeneration and reaction chambers for the removal of entrained finely divided catalyst particles from gaseous or vaporous products prior to withdrawal of the products from the vessel with the thus separated catalyst particles returned to the chamber from whence they came.

When operating a conversion apparatus of the design herein described, the catalyst disengaging space provided above the dense fluidized catalyst bed maintained in each chamber is held to a minimum in order to reduce the overall height of the apparatus. Accordingly, any unusual fluctuations in catalyst bed height, particularly in the reaction chamber, will cause a portion of the catalyst to be dumped or passed over the partition separating the stripping chamber from the reaction chamber and because of the pressure balance resulting therefrom, much of the partially stripped catalyst may then pass through the slots or openings in the partition back into the reaction zone before complete stripping of the catalyst is accomplished. This, of course, makes for an unsatisfactory conversion operation.

The novel and improved stripping zone arrangement provided in accordance with this invention with the highly desirable unitary vessel hereinbefore described overcomes the undesirable condition discussed above with respect to contaminated or incompletely stripped and regenerated catalyst backflowing from the stripping zone into the reaction zone. Furthermore, in this improved segregated stripper design, all of the contaminated catalyst passed from the conversion zone to the stripping zone must pass through the regeneration zone prior to re-entering the conversion zone. In accordance with this invention, the stripping chamber is segregated from the reaction chamber more completely than hereinbefore practiced in the prior art and is provided with suitable one way flow means for transferring contaminated catalyst from the reaction chamber to the stripping chamber and one way flow means for removing stripping gas and stripped products of reaction from the top of the stripping chamber. To provide this improved stripping chamber of this invention, a cover plate or baffle member is placed over the top of the stripping chamber which extends from the vertical partition separating the reaction chamber from the stripping chamber to the wall of the reaction chamber. In addition, this cover plate is placed at an angle which is greater than the angle of repose of the catalyst and is provided with a one way vapor escape opening or exit covered by preloaded or balanced check valves or flap valves which open outwardly into the reaction chamber. Similarly, the vertical partition separating the stripping chamber from the reaction chamber is provided with a plurality of openings therein above the bottom of the reaction zone for the transfer of contaminated catalyst from the reaction zone through these openings into the stripping zone. These slots or openings are also provided with preloaded or balanced check valves which may be referred to as flap valves which open into the stripping zone. Each valve is designed to have a low pressure drop across the valve of from about 0.01 to about 0.09 p.s.i. By this valve arrangement in the walls of the stripping chamber, contaminated catalyst from the reaction chamber can enter the stripping chamber only through the openings or slots in the vertical partition and the valve arrangement of this design prevents catalyst from passing any other way into the stripping chamber. Furthermore, contaminated catalyst cannot be recycled back into the reaction chamber before sufficiently stripped and regenerated.

One of the important aspects of this stripper design resides in obtaining all the benefits of a segregated external stripper without providing the external supporting structure. Another important aspect is the assurance that the stripping of the catalyst will be efficiently accomplished and that the stripped catalyst will be regenerated prior to the catalyst reentering the reaction zone.

When operating the apparatus of this invention, sufficient catalyst bed height is maintained in the reaction zone to provide a positive head of catalyst above the slots or openings in the vertical partition to assure the cyclic passage of catalyst from the reaction zone to the stripping zone, regeneration zone and back to the reaction zone. Normally the bed height above the upper row of catalyst transfer slots in the partition will be from about 2 to about 5 feet. Slots are also provided in the lower portion of the partition, particularly for use in starting up or shutting down the apparatus. This stripper design provides an additional advantage to those hereinbefore described in the event that an unusual pressure surge in the system is encountered for the following reason. In the prior systems employing stripping zones which are in open unrestricted communication with the reaction zone, the stripping zone was subject to depletion of catalyst in the event there was stoppage of flow in the hydrocarbon product withdrawal system which would cause an unusual pressure surge of build up in the reaction zone. This excess pressure would then deplete the stripper of catalyst by forcing the catalyst into the regeneration zone along with some hydrocarbon products of reaction. This obviously is both an unsatisfactory and undesirable condition for the refiner. However, when employing the stripper design of this invention such an occurrence is prevented since the valve at the top of the stripper would be closed by an excess pressure developing in the dilute phase above the dense phase catalyst bed and the dense catalyst bed between the point of product withdrawal and transfer slots to the stripper would necessarily force additional catalyst into the stripper. Thus the operators would be given sufficient time to correct the undesired pressure condition existing within the vessel before hydrocarbon product is passed into the regenerator via the stripping zone.

In a fluidized catalytic cracking system as described herein, a hydrocarbon feed material is passed in contact with a fluidized bed of catalyst in a conversion zone at a temperature between about 750° F. and about 1200° F., most usually at a temperature between about 850° F. and about 1000° F. The pressure in the conversion zone is maintained in the range between about 1 atmosphere and about 50 pounds per square inch gage, preferably between about 1 atmosphere and about 20 pounds per square inch gage. The catalyst to oil ratio may be varied over a relatively wide range of from about 1 to about 20 pounds of catalyst per pound of oil, preferably the ratio being between about 2 and about 12 pounds per pound of oil. To provide a sufficient holding time in the conversion zone, the weight space velocity measured as pounds of oil per hour per pound of catalyst is maintained between about 0.1 and about 10 pounds of oil per hour per pound of catalyst, or more usually between about 0.5 and about 5 pounds of oil per hour per pound of catalyst.

While any suitable cracking catalyst may be employed in the process and apparatus of this invention, the catalyst usually comprises one or more of the metal oxides selected from the group including titanium, boria, zirconia, alumina, magnesia, etc., in combination with silica; also naturally occurring catalysts such as acid treated clays, superfiltrol, etc., may be employed; also contact materials which may be inert to the reaction such as sand, pumice, coke, Carborundum, etc., may be successfully employed in the apparatus described herein. Generally, the contact material employed in a fluid system will usually be formed in a particle size, within the range of from about 1 to about 150 microns, with the majority of the particles falling within the range between about 20 and about 80 microns.

The hydrocarbon feed most usually employed in the catalytic cracking process comprises a mixture of light and heavy gas oils having a gravity in the range between about 20° and about 45° API. However, it is to be understood that other feed materials may also be employed such as those including catalytic cracking, recycle stocks, products of thermal or visbreaking processes or other residual fractions recovered in a refinery. The feed material, depending upon its boiling range and/or gravity, may be introduced in the conversion zone with or without preheat. If preheat is desired, it may be obtained either by indirect heat transfer with hot products of reaction or by passing the feed through fired heaters such that the temperature of the feed may be raised to any desired temperature level, for example, a temperature within the range of from about 300° F., to about 800° F. In the apparatus described herein, conversion of the hydrocarbon feed takes place in the riser, as well as in the relatively dense fluidized bed of catalyst in the reaction zone wherein the catalyst bed density is maintained in the range between about 15 and about 60 pounds per cubic foot in a turbulent state by virtue of the passage of the hydrocarbon feed and products upwardly through the bed. Additional hydrocarbon feed material which may be the same or different from that introduced to the riser, for example recycle stock, may be introduced to the bed of catalyst in the reaction zone. The addition of steam or other inert gas diluents either alone or in admixture with the hydrocarbon feed to assist in fluidizing the catalyst bed and conversion of the hydrocarbon material is optional with the refiner. During the conversion of the hydrocarbon feed material, carbon or coke, as well as volatile hydrocarbon products are deposited on the catalyst particles. Accordingly, to maintain the activity of the catalyst, a portion of the catalyst is continuously removed from the conversion zone, passed to the stripping zone and the stripped catalyst is returned to the regeneration zone with a corresponding amount of regenerated catalyst continuously introduced into the reaction zone. The regeneration of the contaminated catalyst is accomplished by burning of the carbonaceous deposits from the catalyst in the presence of an oxygen-containing gas stream such as air, inert gases containing low percentages of oxygen or other combinations thereof. In the process of this invent, the regeneration of the contaminated catalyst takes place in a relatively dense turbulent fluidized bed of catalyst having a density in the range of from about 20 to about 50 pounds per cubic foot. During regeneration of the catalyst, the temperature in the regeneration zone may be maintained in the range between about 800 to about 1500° F., more usually in the range of from about 900 to about 1200° F., with the pressure maintained in the range of from about 1 atmosphere to about 50 pounds per square inch gage. In the cyclic system of this invention, regenerated catalyst is continuously withdrawn from the dense fluidized catalyst bed, stripped with a suitable stripping gas, and passed to the riser inlet for admixture with hydrocarbon feed and conveyed to the reaction or conversion zone. Usually the regenerated catalyst is transferred at a rate sufficient to maintain the desired temperature level in the conversion zone and is held therein for a sufficient period of time to complete the conversion of the feed material introduced therewith into desired products. Products of reaction are separated from the catalyst in the relatively dilute or dispersed catalyst phase above the dense fluidized catalyst bed and suitable cyclone separating equipment prior to withdrawal from the reaction zone.

In order to provide a better understanding of the improved method and apparatus of this invention, reference is now had by way of example to the accompanying drawing which is a diagrammatic illustration in elevation of a unitary vessel comprising an upper reaction chamber, a lower regeneration chamber, a stripping chamber and interconnecting conduits for the cyclic transfer of finely divided contact material between chambers.

A hydrocarbon feed material having an API gravity of about 30 is preheated to an elevated temperature of about 500° F., in a furnace not shown and the preheated feed is then introduced by conduit 2 for admixture with an inert material such as steam introduced by condit 4 with the mixture then passed to a hollow stem plug valve 6 aligned with the bottom inlet 8 or riser conduit 10. In riser conduit 10 the hydrocarbon feed material admixed with steam and hot freshly regenerated catalyst is passed upwardly through the riser conduit 10 under elevated temperature conversion conditions of about 1000° F., into a distribution zone 12 in the lower portion or bottom of reaction zone 18. In reaction zone 18, a relatively dense fluidized bed of catalyst is maintained under conversion conditions above the grid or perforated member 14 separating the distribution zone 12 from the dense fluidized catalyst bed 16. The mixture of feed and catalyst in the distribution zone 12 is uniformly dispersed throughout the cross-section of the catalyst bed in the reaction zone by passing upwardly through the grid 14. The freshly regenerated catalyst being at an elevated temperature contains sufficient heat to vaporize all or a substantial portion of the feed almost immediately after the feed leaves plug valve 6. The velocity of the mixture comprising oil, steam and catalyst in riser conduit 10, may vary between about 15 and about 60 feet per second. However, in this specific example, a velocity of about 30 feet per second is employed. During passage of the hydrocarbon feed material through the riser and dense fluidized catalyst bed 16 maintained in reactor 18, the feed material is converted into desired products and passes into a dilute catalyst phase 20 above the dense catalyst bed 16 having an interface 22. Products of reaction and entrained finely divided catalyst pass through suitable catalyst cyclone separators not shown for removal of entrained catalyst particles from the products of reaction and the products of reaction are removed from the upper portion of the reaction zone by conduit 24 for further treatment or separation into desired products. During the conversion reaction, the catalyst becomes contaminated with carbonaceous deposits, as well as products of reaction. Accordingly, it is essential prior to passing the contaminated catalyst to the regeneration zone to remove by stripping as much of the occluded reaction products from the catalyst particles as possible. Accordingly, in accordance with this invention, a stripping chamber 32 is provided within the reaction chamber 18 and is separated from the reaction chamber by a vertical partition 30 having a plurality of openings 26 in the partition for the transfer of contaminated catalyst from the dense fluidized catalyst bed into the stripping zone. The openings in the partition are also provided with a balance check valve 28 which opens inwardly into the stripping zone. Check valve 28 is positioned to allow transfer of catalyst into the stripping zone but will close immediately in order to prevent the backflow of catalyst from the stripping zone into the reaction zone. In stripping zone 32, a relatively dense bed of catalyst 34 having upper interface 36 is maintained in the lower portion of the stripping zone and which catalyst bed flows generally downwardly through the stripping zone countercurrent to stripping gas introduced to the lower portion thereof by conduit 40. Generally the temperature in the stripping zone is maintained at about the same temperature as the reaction zone, usually about 900° F. However, the temperature in the stripper may be higher or lower than the reaction temperature. Above the dense bed of catalyst 34 in the stripping zone is provided a dispersed phase 38 through which stripping gas and stripped products of reaction pass upwardly and are discharged from the top of the stripping zone through opening 42 into the dilute or dispersed catalyst phase 20 of the reaction zone. The top of the stripping zone is also provided with a baffle 44 sloping downwardly at an angle greater than the angle of repose of the catalyst and the opening 42 in baffle 44 is provided with a balance check valve 46 which opens outwardly into the reaction zone. By this arrangement, stripped products of reaction and stripping gas are allowed to pass from the stripping chamber into the reaction chamber, but the valve arrangement will prevent the passage of catalyst from the reaction zone over the top of partition 30 into the stripping chamber. By the valve arrangement and bed height within the stripping zone 32 the contaminated catalyst passed from the reaction zone into the stripping zone passes through a relatively dilute stripping phase prior to falling onto the relatively dense bed of catalyst 34 maintained in the lower portion of the stripping zone. This dilute phase stripping of the catalyst greatly improves the efficiency of the stripping operation and facilitates removal of the stripped reaction products from the catalyst prior to passing the catalyst into the dense phase stripping reaction from whence the stripped catalyst is passed to the regeneration zone. As hereinbefore described, in accordance with one embodiment of this invention, the withdrawn catalyst moves continuously downward through the stripping zone first through a dilute catalyst phase and then a dense catalyst phase countercurrent to stripping gas introduced by conduit 40 and the thus stripped catalyst is withdrawn as a relatively dense column of catalyst and passes downwardly through standpipe 48 to discharge outlet 50 into a dense fluidized bed of catalyst 52 in the regeneration zone 54. Aligned with discharge outlet 50 is a vertical movable plug valve 56 for controlling the quantity of catalyst discharged from standpipe 48 into the regeneration zone. In the regeneration zone, oxygen-containing gas or air is introduced by conduits 58 and 60 which regeneration gas then passes upwardly through a grid or perforated member 62 and into contact with the contaminated catalyst to remove carbonaceous deposits by burning. Above the grid 62 the catalyst is maintained in a relatively dense turbulent fluidized condition and the catalyst is regenerated therein by burning in the presence of air or other oxygen-containing gases passed upwardly therethrough at a temperature of about 1050° F. The products of combustion or flue gas are removed from the upper portion of the bed, passed through suitable cyclone separators not shown and withdrawn from the regeneration zone by conduit 64. Surrounding the lower portion of riser conduit 10 there is provided a substantially vertical cylindrical well 66 which extends upwardly from the bottom of the regeneration zone above the catalyst discharge outlet of standpipe 48 and the inlet of riser conduit 10. Regenerated catalyst is withdrawn from the dense fluidized catalyst bed 52 and passes downwardly through the annular space 68 between the riser conduit 10 and wall 66 of the well. The freshly regenerated catalyst passed downwardly through this annular space 68 flows countercurrently to suitable stripping gas such as steam introduced by conduit 70. In well 66, the catalyst reverses its direction of flow and enters inlet 8 of riser conduit 10 for admixture with the feed and returns to the reaction zone.

*Example*

Having thus described the method of operation with respect to a preferred apparatus design, the following operating conditions are specifically set out by way of example for practicing the improved process of this invention.

| | |
|---|---|
| Reactor pressure top | 10.0 p.s.i.g. |
| $\Delta p$ reactor bed | 3.7 p.s.i. |
| Pressure above grid | 13.7 p.s.i.g. |
| Grid $\Delta p$ | 1.0 p.s.i. |
| Pressure at top of riser | 15.3 p.s.i.g. |
| Riser $\Delta p$ | 3.5 p.s.i. |
| Riser valve $\Delta p$ | 2.0 p.s.i. |
| Pressure in well | 20.8 p.s.i.g. |
| Bed $\Delta p$ in well | −3.5 p.s.i. |
| Regenerator pressure top | 17.3 p.s.i.g. |
| $\Delta p$ regenerator bed | 3.1 p.s.i. |
| Pressure above grid in regenerator | 20.4 p.s.i.g. |
| Standpipe Plug valve $\Delta p$ | 2.0 p.s.i. |
| Pressure in standpipe above valve | 22.4 p.s.i.g. |
| Standpipe $\Delta p$ | −9.6 p.s.i. |
| Stripper bottom | 12.8 p.s.i.g. |
| Stripper bed $\Delta p$ for 9 foot bed | −1.9 p.s.i. |
| Pressure at top of stripper bed | 10.9 p.s.i.g., 10.1 p.s.i.g. |
| Vapor valve in top of stripper $\Delta p$ | −0.9 p.s.i., −0.1 p.s.i. |
| Pressure at catalyst check valve reactor side | 11.0 p.s.i.g., |
| Catalyst check valve $\Delta p$ | −0.1 p.s.i., −0.9 p.s.i. |
| Reactor temperature | 900° F. |
| Regenerator temperature | 1050° F. |
| Stripper temperature | 875° F. |

It can be seen from the above data that the desired pressure balance of the system for cyclic catalyst flow is not measurably disturbed when employing the novel and improved stripper design of this invention. This, of course, is of particular interest to the refiner employing a unitary reactor-regenerator vessel similar to that disclosed herein, since the stripper may be readily altered to incorporate the improved stripper disclosed herein by installation of the necessary check valve and cover plate over the stripper section.

Therefore, as hereinbefore indicated, applicant's improved stripper not only prevents flow of catalyst into the reaction zone before complete stripping and regeneration thereof, but the novel stripper design has an additional advantage in that it provides for disbursed phase stripping of the catalyst above the bed of catalyst maintained in the stripping zone.

While the improved stripper of the present invention has been specifically described with respect to a unitary apparatus having an upper reaction zone and a lower regeneration zone, it is to be understood that the improved stripper design may be employed in any reactor-regenerator system whether the regeneration zone is either above, below or adjacent to the reaction zone.

Having thus described my invention, it is to be understood that the invention is not to be unnecessarily limited to the specific examples presented herein which have been the specific examples presented herein which have been offered merely to illustrate a preferred method of practicing the invention and that modifications may be made thereto without departing from the spirit thereof.

I claim:

1. In a hydrocarbon conversion process wherein a finely divided catalyst is circulated between a reaction zone and a regeneration zone, the improvement which comprises, passing catalyst contaminated with reaction products from a dense fluidized bed of catalyst in a reaction zone through a first valved opening in a partition separating a stripping zone from said reaction zone, said valved opening arranged to exclude flow of catalytic material from the stripping zone into the reaction zone, stripping the catalyst passed to said stripping zone with a suitable stripping gas, withdrawing stripped catalytic material from the lower portion of the stripping zone and passing the stripped catalytic material to a regeneration zone, regenerating the stripped catalyst in said regeneration zone and passing the regenerated catalyst to said reaction zone, withdrawing stripping gas containing stripped products of reaction from the upper portion of the stripping zone and passing the same into the upper portion of the reaction zone above the bed of catalyst therein through a second valved opening in said partition, said second valved opening arranged to exclude flow of catalytic material from said reaction zone to said stripping zone.

2. In a conversion process wherein contact material is passed from a reaction zone to a stripping zone, a regeneration zone and back to the reaction zone, the improved method of operation to prevent the stripping zone from being depleted of contact material due to a pressure surge in the reaction product withdrawal system which comprises passing contact material containing reaction products from a dense fluidized bed of contact material in the reaction zone to the stripping zone through a passageway which excludes flow of contact material from the stripping zone to the reaction zone, stripping the contact material in said stripping zone with a suitable stripping gas, and passing the stripped gas containing stripped reaction products to the upper portion of the reaction zone through a pressure responsive passageway which closes to exclude flow of contact material from the reaction zone to the stripping zone.

3. An improved apparatus comprising in combination, a reaction chamber, a transverse baffle member extending upwardly from the bottom of said reaction chamber forming a separate stripping chamber in one portion of the reaction chamber, a first passageway in the lower portion of said baffle member for transfer of finely divided contact material from said reaction chamber to said stripping chamber, said first passageway provided with a flop valve opening into said stripping chamber, a second passageway in the upper portion of said baffle member, said second passageway provided with a flop valve opening into said reaction chamber, means for introducing finely divided contact material and reactant material into the lower portion of said reaction chamber, means for removing product material including stripped product material from the upper portion of said reaction chamber, means for introducing stripping gas to the lower portion of said stripping chamber and means for removing stripped contact material from the lower portion of said stripping chamber.

4. An apparatus comprising in combination, a reaction chamber, a stripping chamber adjacent to said reaction chamber having a common wall therebetween, a first passageway in the lower portion of said common wall for transfer of finely divided contact material from the reaction chamber to the stripping chamber, said first passageway provided with a pressure responsive valve means which opens into said stripping chamber, a second passageway in the upper portion of said common wall provided with a pressure responsive valve means which opens into said reaction chamber for flow of gaseous material therethrough, means for introducing and maintaining a dense fluid bed of contact material in the lower portion of said reaction chamber the interface of which is above said first passageway, means for introducing stripping gas to the lower portion of said stripping chamber, and means for removing contact material from the lower portion of said stripping chamber.

5. An apparatus comprising in combination, a reactor chamber, means for maintaining a dense fluidized bed of contact material having an upper interface in said reaction chamber, a stripping chamber adjacent to said reactor chamber, a first passageway for transfer of contact material from below the interface of the dense fluidized bed of contact material in the reaction chamber to the stripping chamber, said first passageway provided with a pressure responsive valve means which permits flow of contact material only into said stripping chamber, means for introducing stripping gas to the lower portion of said stripping chamber, means for withdrawing contact material from the lower portion of the stripping chamber, a second passageway communicating between the upper portion of said stripping chamber and the upper portion of said reaction chamber above said fluid bed interface, said second passageway provided with a pressure responsive valve means which permits flow of gaseous material only into said reaction chamber and means for removing stripping gas from the upper portion of said reactor chamber.

6. An apparatus comprising in combination, an upper reactor chamber, a lower regenerator chamber, a stripping chamber adjacent to said reactor chamber having a common wall therebetween, a first conduit extending downwardly from the bottom of said stripping chamber to the lower portion of said regeneration chamber, a second conduit extending from the lower portion of said regeneration chamber into said reactor chamber, a first lower passageway communicating between said reactor chamber and said stripping chamber for passage of finely divided contact material from said reactor chamber into said stripping chamber, a second upper passageway for flow of gaseous material from said stripping chamber into the upper portion of said reactor, said second passage adapted by valve means to exclude flow of contact material from said reaction chamber to said stripping chamber but permit flow of gaseous material from said stripping chamber to said reactor chamber, means for introducing gaseous material to the lower portion of said stripping chamber and the lower portion of said regeneration chamber, means for introducing vaporous material to the lower portion of said reactor chamber and means for removing gaseous material from the upper portion of said reactor chamber and said regenerator chamber.

7. A method of operation which comprises maintaining a fluid bed of finely divided contact material in a reaction zone under conversion conditions, introducing a hydrocarbon reactant material into the lower portion of said reaction zone for conversion therein into desired products, recovering hydrocarbon product material from the upper portion of said fluid bed, passing finely divided contact material from said fluid bed into an adjacent stripping zone through a pressure responsive passageway which will prevent backflow of contact material therethrough, maintaining the contact material in the lower portion of said stripping zone in a dense fluid condition by introducing stripping gas to the lower portion thereof, and passing stripping gas from the upper portion of the stripping zone into the upper portion of the reaction zone and above the fluid bed of contact material therein through a second pressure responsive passageway which will close and exclude flow of gaseous material from the upper portion of the reaction zone into the upper portion of the stripping zone.

8. A method which comprises introducing hydrocarbon reactant material into the lower portion of a dense fluid bed of catalytic material maintained under conversion conditions in a conversion zone, recovering hydrocarbon conversion products in the upper portion of the conversion zone and above the dense fluid bed of catalytic material, passing catalytic material containing entrained hydrocarbon material from said dense fluid bed in said conversion zone to a stripping zone, stripping the catalytic material in said stripping zone by introducing stripping gas to the lower portion thereof, recovering stripped catalytic material from the lower portion of the stripping zone, recovering gaseous material including stripped hydrocarbon material and stripping gas in the upper portion of the stripping zone and passing the gaseous material from the upper portion of the stripping zone into the upper portion of the conversion zone through a passageway which closes responsive to pressures in the upper portion of the conversion zone being above the pressure in the upper portion of the stripping zone.

9. A system which comprises maintaining finely divided contact material in a dense fluid bed superimposed by a dilute phase of contact material in a reaction zone and a stripping zone by the introduction of gasiform material to the lower portion thereof, passing contact material directly from the dense fluid bed of contact material in the reaction zone into the stripping zone through a passageway which will permit flow of contact material only in one direction and passing gasiform material from the dilute phase in the stripping zone into the dilute phase in the reaction zone through a passageway which will permit flow of gasiform material only in one direction.

10. A method which comprises maintaining a dense fluid bed of catalytic material superimposed by a dilute phase of catalytic material in a reaction zone and a stripping zone by introducing gasiform material to the lower portion of each of said zones, passing catalytic material from the dense fluid bed in said reaction zone into said stripping zone through a passageway which will close and prevent backflow of catalytic material therethrough and passing gasiform material from the upper portion of said stripping zone into the upper portion of said reaction zone through a second passageway which will close when the pressure in the upper portion in the reaction zone exceeds the pressure in the upper portion of the stripping zone.

References Cited in the file of this patent

UNITED STATES PATENTS

| 2,530,645 | Bockman | Nov. 21, 1950 |
| 2,671,102 | Jewell | Mar. 2, 1954 |
| 2,702,267 | Keith | Feb. 15, 1955 |
| 2,710,279 | Siecke | June 7, 1955 |
| 2,871,186 | Francisco et al. | Jan. 27, 1959 |
| 2,900,330 | Skelly | Aug. 18, 1959 |
| 2,901,331 | Held et al. | Aug. 25, 1959 |

FOREIGN PATENTS

| 574,064 | Great Britain | Dec. 19, 1945 |
| 754,567 | Great Britain | Aug. 8, 1956 |